(12) United States Patent
Gedik et al.

(10) Patent No.: US 9,170,794 B2
(45) Date of Patent: *Oct. 27, 2015

(54) AUTOMATIC EXPLOITATION OF DATA PARALLELISM IN STREAMING APPLICATIONS

(75) Inventors: Bugra Gedik, White Plains, NY (US); Martin J. Hirzel, White Plains, NY (US); Scott A. Schneider, White Plains, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 527 days.

This patent is subject to a terminal disclaimer.

(21) Appl. No.: 13/596,676

(22) Filed: Aug. 28, 2012

(65) Prior Publication Data

US 2014/0068577 A1    Mar. 6, 2014

(51) Int. Cl.
*G06F 9/45* (2006.01)

(52) U.S. Cl.
CPC ...................... *G06F 8/456* (2013.01)

(58) Field of Classification Search
USPC .......................................................... 717/143
See application file for complete search history.

(56) References Cited

U.S. PATENT DOCUMENTS

2007/0169057 A1* 7/2007 Silvera et al. ................. 717/160

OTHER PUBLICATIONS

Isard et al., "Dryad: Distributed Data-Parallel Programs from Sequential Building Blocks", 2007, ACM, EuroSys'07.*

Gordon et al., "Exploiting Coarse-Grained Task, Data, and Pipeline Parallelism in Stream Programs", 2006, ACM, ASPLOS'06.*
Dean et al., "MapReduce: Simpli_ed Data Processing on Large Clusters", 2004, OSDI.*
Arasu, A., et al., "The CQL Continuous Query Language: Semantic Foundations and Query Execution", The VLDB Journal, Jul. 22, 2005, pp. 121-142.
Dean, J., et al., "MapReduce: Simplified Data Processing on Large Clusters", UNSENIX Association, OSDI '04: 6th Symposium on Operating Systems Designs and Implementation.
Gordon, M., et al., Exploiting Coarse-Grained Task, Data, and Pipeline Parallelism in Stream Programs, ASPLOS '06, Oct. 21-25, 2006, pp. 151-162.
Graefe, G., et al., "Encapsulation of Parallelism in the Volcano Query Processing System", 1990 ACM, pp. 102-111.
Isard, M., et al., "Dryad: Distributed Data-Parallel Programs from Sequential Building Blocks", EuroSys '07, Mar. 21-23, 2007, pp. 59-72.

* cited by examiner

*Primary Examiner* — Li B Zhen
*Assistant Examiner* — Sen Chen
(74) *Attorney, Agent, or Firm* — Cahn & Samuels, LLP

(57) ABSTRACT

An embodiment of the invention provides a method for exploiting stateless and stateful data parallelism in a streaming application, wherein a compiler determines whether an operator of the streaming application is safe to parallelize based on a definition of the operator and an instance of the definition. The operator is not safe to parallelize when the operator has selectivity greater than 1, wherein the selectivity is the number of output tuples generated for each input tuple. Parallel regions are formed within the streaming application with the compiler when the operator is safe to parallelize. Synchronization strategies for the parallel regions are determined with the compiler, wherein the synchronization strategies are determined based on the definition of the operator and the instance of the definition. The synchronization strategies of the parallel regions are enforced with a runtime system.

5 Claims, 3 Drawing Sheets

AUTOMATIC EXPLOITATION OF DATA PARALLELISM IN STREAMING APPLICATIONS

BACKGROUND

The present invention is in the field of systems, methods, and computer program products for the automatic exploitation of data parallelism in streaming applications.

Stream processing is a programming paradigm that naturally exposes task and pipeline parallelism. While pipeline and task parallelism occur naturally in stream graphs, data parallelism requires intervention. In the streaming context, data parallelism involves splitting data streams and replicating operators. The parallelism obtained through replication can be more well-balanced than the parallelism that exists in a particular stream graph, and can be more easily scaled to the resources at hand. Such data parallelism allows operators to take advantage of additional cores and hosts that the task and pipeline parallelism are unable to exploit.

SUMMARY OF THE INVENTION

An embodiment of the invention includes a method for exploiting stateless and stateful data parallelism in a streaming application, wherein a compiler determines whether an operator of the streaming application is safe to parallelize based on a definition of the operator and an instance of the definition. The definition of the operator includes a template of the operator; and, the instance of the definition includes a modified version of the template. The operator is not safe to parallelize when the operator has selectivity greater than 1, wherein the selectivity is the number of output tuples generated for each input tuple. Parallel regions are formed within the streaming application with the compiler when the operator is safe to parallelize. Synchronization strategies for the parallel regions are determined with the compiler, wherein the synchronization strategies are determined based on the definition of the operator and the instance of the definition. The synchronization strategies of the parallel regions are enforced with a runtime system.

Another embodiment of the invention includes a method for exploiting stateless and stateful data parallelism in a streaming application, wherein a compiler determines whether parallelizing an operator of the streaming application will preserve sequential semantics of the streaming application. The determining of whether parallelizing an operator of the streaming application will preserve sequential semantics of the streaming application is based on an operator template and an operator instance. The operator is not safe to parallelize when the operator has a non-partitioned state, the operator has selectivity greater than 1, wherein the selectivity is a number of output tuples generated for each input tuple, the operator has more than one input port, the operator has more than one output port, the operator is depended on by another operator, wherein the dependency is a co-location constraint, and/or the operator is depended on by another operator, wherein the another operator consumes punctuations generated by the operator. Parallel regions are formed within the streaming application with the compiler when the operator is safe to parallelize. Synchronization strategies for the parallel regions are determined with the compiler, wherein the synchronization strategies are determined based on the operator template and the operator instance. The synchronization strategies of the parallel regions are implemented with a runtime system.

Another embodiment of the invention includes a system having a compiler and a runtime system connected to the compiler. The compiler determines whether an operator of the streaming application is safe to parallelize based on a definition of the operator and an instance of the definition, wherein the definition of the operator includes a template of the operator, and wherein the instance of the definition includes a modified version of the template. The compiler determines that the operator is not safe to parallelize when the operator has non-partitioned state and/or when the operator has selectivity greater than 1, wherein the selectivity is the number of output tuples generated for each input tuple. The compiler forms parallel regions within the streaming application when the operator is safe to parallelize. The compiler also determines synchronization strategies for the parallel regions, wherein the synchronization strategies are determined based on the definition of the operator and the instance of the definition. The runtime system enforces the synchronization strategies of the parallel regions.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
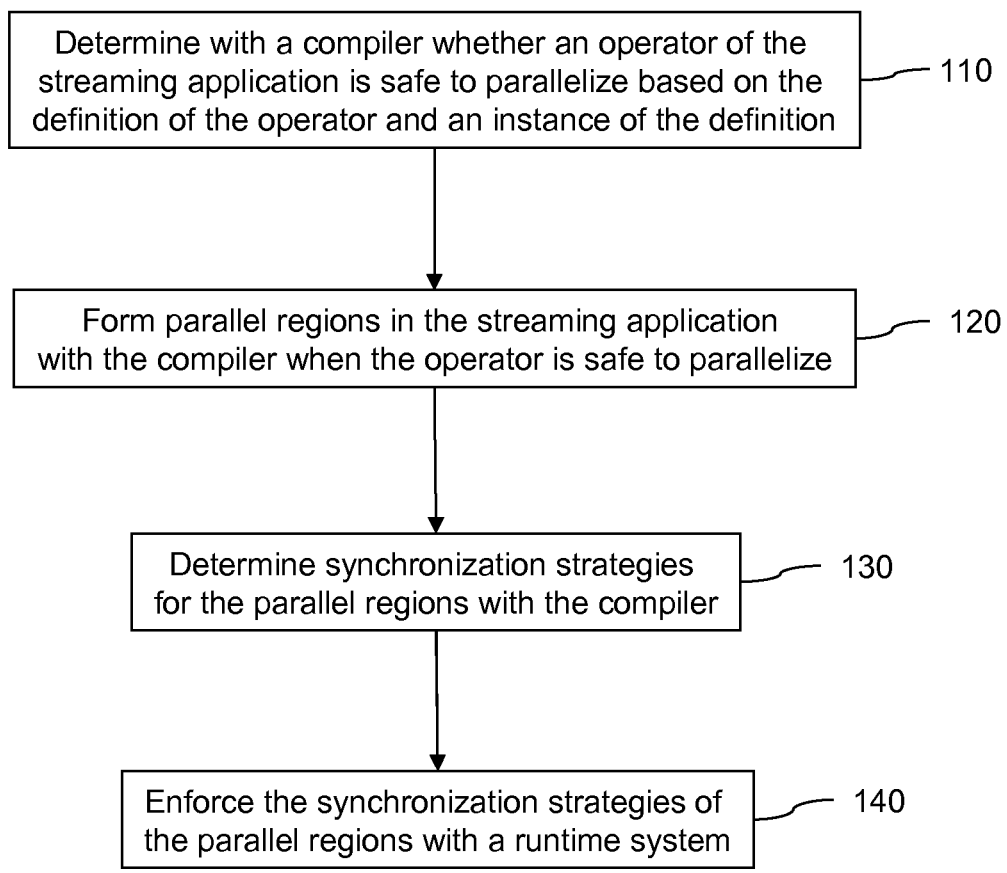
FIG. 1 is a flow diagram illustrating a method for exploiting stateless and stateful data parallelism in a streaming application according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention automatically exploits data parallelism in streaming applications with stateful operators and user-defined operators. More specifically, a compiler analyzes code in a streaming application to determine which subgraphs can be parallelized with which technique. The runtime system implements the various techniques, such as roundrobin or hashing, with sequence numbers as needed, to back the decisions of the compiler. The compiler is oblivious to the actual size and configuration of the cluster, and only decides which operators belong to which parallel region, but not what the degree of parallelism in each region is. The actual degree of parallelism is decided at job submission time, which can adapt to system conditions at that moment. This decoupling increases performance portability of streaming applications.

At least one embodiment of the invention provides language and compiler support for automatically discovering safe parallelization opportunities in the presence of stateful and user-defined operators. In addition, runtime support is provided for enforcing safety while exploiting the concrete number of cores and hosts of a given distributed, shared-nothing cluster.

An embodiment of the invention provides a system and method for automatic exploitation of data parallelism in streaming applications, wherein the system includes a compiler and a runtime system. The compiler determines if an operator instance is safe to parallelize. An operator instance is not safe to parallelize if the operator instance has non-partitioned state, has more than one input port, or has more than one output port. If an operator instance has a selectivity greater than 1, where selectivity is the number of output tuples generated for each input tuple, then the operator instance is not safe to parallelize. Furthermore, an operator instance is not safe to parallelize if the operator instance is depended on by another operator instance, where the dependency is a co-location constraint. As described more fully below, if the operator instance is depended on by another operator instance, where the another operator instance consumes punctuations generated by this operator instance, then the operator instance is not safe to parallelize.

If the operator instance is safe to parallelize, the compiler forms the parallel regions and determines their synchronization strategies. The runtime system enforces the synchronization strategy of a parallel region. In at least one embodiment, the runtime system uses round-robin as the synchronization strategy as instructed by the compiler. In another embodiment, the runtime system uses sequence numbers and pulses as the synchronization strategy as instructed by the compiler. If a parallel region has more than one operator instance with a partitioned state, then those operator instances have compatible keys. If two adjacent parallel regions have incompatible keys, then a shuffle is used in between them to avoid a sequential bottleneck.

FIG. 1 is a flow diagram illustrating a method for exploiting stateless and stateful data parallelism in a streaming application according to an embodiment of the invention. The streaming application includes one or more operators, wherein each operator has a definition (also referred to herein as a "template" of the operator). An instance of the definition can be a modified version of the template. A compiler determines whether an operator of the streaming application is safe to parallelize based on the definition of the operator and an instance of the definition (also referred to herein as an "operator template" and an "operator instance", respectively) 110. As used herein, the term "compiler" includes a hardware component (with or without software) connected to a runtime system, wherein the compiler determines whether an operator of the streaming application is safe to parallelize and forms parallel regions within the streaming application when the operator is safe to parallelize. As used herein, the term "runtime system" includes one or more hardware components connected to the compiler, wherein the runtime system enforces the synchronization strategies of the parallel regions.

Determining whether the operator of the streaming application is safe to parallelize includes determining whether parallelizing the operator would preserve sequential semantics of the streaming application. As used herein, the term "sequential semantics" includes the behavior of the streaming application without the auto-parallelization step. Streaming applications consist of operators, where the operators perform computations on streams of tuples, which are essentially infinite sequences of discrete data items. Applications which have not been auto-parallelized have a certain order in which tuples are processed. For example, if tuples T1, T2, and T3 are in a stream, and are processed by operator O, then the tuples produced by O will be in the same order: T1', T2', and T3'. T1', T2', and T3' are the results of O processing T1, T2, and T3. An embodiment of the invention replicates O, such that multiple copies of O perform computations on tuples in parallel. If there are two copies O1 and O2, O1 can process tuple T1 at the same time that O2 is processing T2. If O2 finishes before O1, T2' could emerge before T1'. This would violate "sequential semantics." The runtime system herein ensures that T1' emerges before T2' to preserve sequential semantics.

In at least one embodiment of the invention, the operator is not safe to parallelize when the operator has non-partitioned state. An operator has partitioned state if it has a key that is used to determine where to direct input and the operator maintains state across executions with different tuples. For example, in a streaming application to monitor stock prices for Company A, Company B, Company C, etc., the key is the field that identifies the company name. The running average price of stock sold for the company is the state, which can be updated each time stock is sold. The streaming application is partitioned based on the company name, wherein the company name is the key, and wherein each key is independent of each other. If, however, an application monitors the running average of all stocks traded (regardless of the company name), then the operators would have non-partitioned state (i.e., not safe to parallelize). Because every stock sold (no matter which company) changes the running average, there is no key.

In another embodiment, the operator is not safe to parallelize when the operator has a selectivity greater than 1, where the selectivity is the number of output tuples generated for each input tuple. For instance, in the example above, the streaming application maintains a running average of stock prices for Company A, where every time Company A stock is sold, the new running average is computed and output. Therefore, the selectivity is 1 because every time input is received, an output is generated. If, however, an application outputs the running average once for every 10 stock sales, then the selectivity would be 0.1. If 2 or more discrete outputs are generated for each stock sale (e.g., current average, daily average, median in different tuples), then the selectivity would be 2 or greater.

Figure 2:
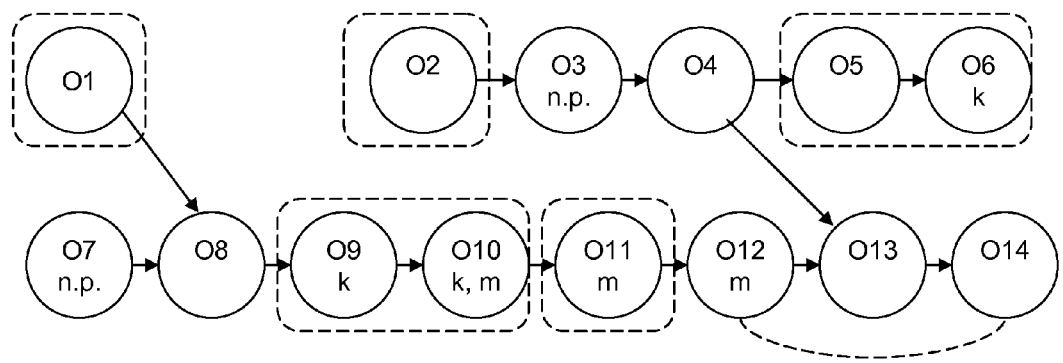
FIG. 2 illustrates a streaming application according to an embodiment of the invention

In yet another embodiment, the operator is not safe to parallelize when the operator has more than one input port. The number of input ports measures the number of outside entities that are communicating with the operator. FIG. 2 illustrates a streaming application having operators O1-O14 according to an embodiment of the invention. Operator O10 has a single input port and a single output port. Conversely, operator O8 has two input ports and one output port. Therefore, in one embodiment, operator O10 is safe to parallelize and operator O8 is not safe to parallelize. In another embodiment of the invention, the operator is not safe to parallelize when the operator has more than one output port. Operator O4 has two output ports and one input port. Thus, in one embodiment, operator O4 is not safe to parallelize.

In still another embodiment, the operator is not safe to parallelize when the operator is depended on by another operator, wherein the dependency is a co-location constraint (physical or logical). In FIG. 2, the dashed boxes indicate parallel regions; and, the dotted line indicates a dependency among the operators. In one embodiment, the dependency is a co-location constraint, i.e., the operators have to execute on the same machine. Because of this dependency, operators O12 and O14 are not safe to parallelize.

In still yet another embodiment, the operator is not safe to parallelize when the operator is depended on by another operator, wherein the another operator consumes punctuations generated by the operator. The operators can produce tuples every time that they execute a piece of code. When an operator is finished with a logical task (which may be the result of one or more executions), it can send out a punctuation to indicate that it has completed the logical task. Thus, punctuations can be logical separators in the data stream. In FIG. 2, operator O14 depends on getting punctuations from operator O12. Therefore, neither operator O14 nor O12 are safe to parallelize due to the punctuation dependency.

One of ordinary skill in the art would understand based on this disclosure that the above embodiments can be grouped together in a variety of ways as well as be used individually. The compiler forms parallel regions within the streaming application when the operator is safe to parallelize 120. In at least one embodiment, regions are formed from left-to-right. For instance, as illustrated in FIG. 2, the first parallel region only contains operator O1, since its successor operator O8 is not safe to parallelize, as described above. Similarly, the next region only contains operator O2, since its successor operator O3 is "n.p." (not parallelizable), for example, due to an unknown state or selectivity greater than 1. As described above, operator O4 is not safe to parallelize. Operators O5 and O6 are combined in a single region, since operator O5 is stateless and operator O6 has state partitioned by key {k}. Operator O7 is not parallelizable (n.p.). The region including operators O9 and O10 ends before operator O11 because adding operator O11 would lead to an empty region key. As also described above, operators O12, O13, and O14 are not safe to parallelize. In another embodiment, where the regions are not formed left-to-right, operator O10 is combined with operator O11 instead of operator O9.

Synchronization strategies are determined for the parallel regions 130. In at least one embodiment, the synchronization strategies are determined by the compiler based on the definition of the operator and the instance of the definition. The synchronization strategies of the parallel regions are enforced with a runtime system 140.

In at least one embodiment of the invention, the runtime system uses round-robin as the synchronization strategy, as instructed by the compiler, if all operators in the parallel region are stateless and have a selectivity of 1. Because there is no state, the splitter has the freedom to route any tuple to any parallel channel. On the other end, the merger can exploit the fact that there will be an output tuple for every input tuple. Tuple ordering can be preserved by enforcing that the merger pops tuples from the channel queues in the same order that the splitter sends them. Because the splitter and merger are (implicitly) synchronized on which channels they send and receive tuples from, and no tuples are dropped, no extra information is required to maintain proper ordering.

In another embodiment, the runtime system uses sequence numbers and pulses as the synchronization strategy as instructed by the compiler, if an operator has a selectivity of 1 and is in a partitioned state. Sequence numbers and pulses permits operators with selectivity less than 1, meaning they may drop tuples. In that case, if the last tuple to be submitted is y, the merger cannot wait until y+1 shows up because it may never come. The merger does not use a timeout because the channel that y+1 would come in on may be slow. The merger discriminates between something that is gone and something that is merely slow. Pulses solve this problem. The splitter periodically sends a pulse on all channels, and the length of this period is an epoch (or a predetermined length).

In at least one embodiment, the epoch is a function of the number of tuples sent per channel. Thus, for example, if an epoch has 10 tuples per channel, then the splitter sends a pulse on all channels whenever it has sent 10x tuples, where "x" is the number of channels. This is done to keep the number of tuples sent per channel constant. A timer can be used to determine the length of an epoch, e.g., a pulse is sent on all channels every millisecond. Each pulse sent on all channels receives the same sequence number, and pulses are merged along with tuples. Operators in parallel channels forward pulses regardless of their selectivity; even an operator that drops all tuples forwards pulses.

The presence of pulses guarantees that the merger will receive information on all incoming channels at least once per epoch. The merger uses pulses and the fact that all tuples and pulses come in sequential order on a channel to infer when a tuple has been dropped. In addition to the next-heap, the merger maintains an additional minimum-heap of the tuples last seen on each channel, which are the backs of the channel queues. This heap keeps track of the minimum of the maximums; the back of each channel queue is the highest sequence number seen on that channel, and the top of this heap is the minimum of those. Using a heap ensures that finding the min-of-the-maxes is a log N operation.

The following provides an example of sequence numbers and pulses as the synchronization strategy, where the tuple with sequence number z arrives. If z−1=last, where last is the sequence number of the tuple submitted last, then z is ready to be submitted. If that is not the case, z may still be ready to be submitted if there is enough information to infer that z−1 has been dropped. The top of the seen-heap can provide such information: if z−1 is less than the top of the seen-heap, then it can be determined that z−1 is never coming. The top of the seen-heap is the lowest sequence number among the backs of the channel queues (the min-of-the-maxes); and, the channel queues are in sequential order. The seen-heap is used to check the status of all of the channels. If z−1 (the tuple that z must wait on) is less than the backs of all of the channel queues, then z−1 will not arrive on any channel.

In at least one embodiment of the invention, when a parallel region includes more than one operator instance with a partitioned state, the operator instances of the parallel region include compatible keys. For example, operator O9 determines the running average of stock prices and includes the key "k" (e.g., the company name). Operator O10 is also partitioned on the same key "k". Because operators O9 and O10 are partitioned in the same way (i.e., include compatible keys), both operators can be included in the same parallel region. Operator O10 also includes the key "m" (e.g., the amount traded (the user wants to know the running average every time 50 units, 100 units, 150 units are traded)). Operator O11 is not partitioned by the key "k"; and as such, operators O9 and O11 cannot be in the same parallel region. If operator O9 was not included with operators O10 and O11 (i.e., operator O9 is on its own parallel region), then operators O10 and O11 could be grouped together in the same parallel region. In at least one embodiment, the region formation algorithm goes from left to right (source to sink). Thus, operators O9 and O10 are grouped together, and operator O11 is on its own parallel region.

In at least one embodiment of the invention, a shuffle is performed when two adjacent parallel regions include incompatible keys. In principle, shuffles are splits and merges at the edges of adjacent parallel regions (e.g., between operators O10 and O11). In at least one embodiment, ordinary splitters have both routing and ordering responsibilities. The ordering responsibility for an ordinary splitter is to create and attach sequence numbers (if needed) to each outgoing tuple. When tuples arrive at a splitter in a shuffle, those tuples already have sequence numbers. The processing element itself preserves sequence numbers, so a splitter in a shuffle only has routing responsibilities. Splitters inside of a shuffle also do not generate pulses; they were already generated by the splitter at the beginning of the parallel region. When mergers exist at the edge of parallel regions, they are responsible for stripping off the sequence numbers from tuples and dropping pulses. Mergers that are a part of a shuffle preserve sequence numbers and pulses; but they cannot do so naively, since mergers inside of a shuffle will receive N copies of every pulse, where N is the number of parallel channels. The split before them has to forward each pulse it receives to all of the mergers in the shuffle, meaning that each merger receives a copy of each pulse. The merger ensures that only one copy of each pulse is forwarded on through the channel. If the merger did not drop duplicated pulses, then the number of pulses that arrived at the final merger would be on the order of $N^s$ where s is the number of stages connected by shuffles.

At least one embodiment of the invention determines the synchronization strategy when a parallel region has multiple operators. For example, an operator that is stateless and has selectivity of 1 can be synchronized using round-robin sending of tuples. However, the operator may be in a parallel region with operators that cannot be synchronized with round-robin (e.g., an operator with partitioned state). Given that it is known what the synchronization strategy "should" be for each operator in a parallel region, determining what it will be for the entire region involves picking the most permissive strategy. The strategy is "permissive" in the sense that it permits the operators to do more, be selective, have state.

In at least one embodiment, round-robin is the least permissive strategy; sequence numbers is more permissive; and, sequence numbers and pulses is the most permissive. If an operator in a parallel region requires sequence numbers and pulses, then the entire region will use that as its synchronization strategy even if the other operators in the region could use a more restrictive strategy.

Figure 3:
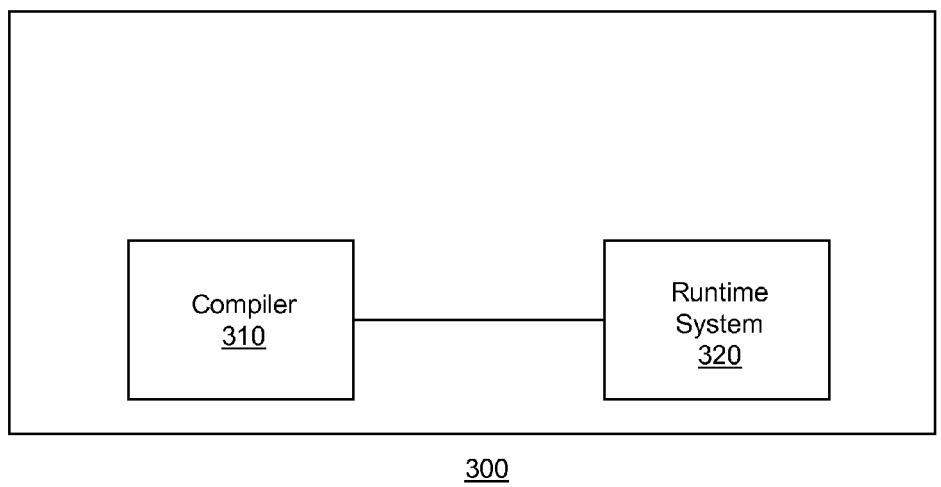
FIG. 3 illustrates a system for exploiting stateless and stateful data parallelism in a streaming application according to an embodiment of the invention.

FIG. 3 illustrates a system 300 for exploiting stateless and stateful data parallelism in a streaming application according to an embodiment of the invention, wherein the system 300 includes a compiler 310 connected to a runtime system 320. The compiler 310 determines whether an operator of the streaming application is safe to parallelize based on a definition of the operator and an instance of the definition, wherein the definition of the operator includes a template of the operator, and wherein the instance of the definition includes a modified version of the template. In at least one embodiment, the compiler 310 determines whether parallelizing the operator would preserve sequential semantics of the streaming application. The compiler 310 determines that the operator is not safe to parallelize: when the operator has non-partitioned state; when the operator has selectivity greater than 1, where the selectivity is the number of output tuples generated for each input tuple; when the operator has more than one input port; when the operator has more than one output port; when the operator is depended on by another operator, where the dependency is a co-location constraint; and/or when the operator is depended on by another operator, where the another operator consumes punctuations generated by the operator.

The compiler 310 forms parallel regions within the streaming application when the operator is safe to parallelize. When a parallel region of the parallel regions include more than one operator instance with a partitioned state, the operator instances of the parallel region include compatible keys. Furthermore, the compiler 310 determines synchronization strategies for the parallel regions based on the definition of the operator and the instance of the definition.

The runtime system 320 enforces the synchronization strategies of the parallel regions. The runtime system 320 can perform a shuffle when two adjacent parallel regions include incompatible keys. Moreover, the runtime system 320 can use round-robin and/or sequence numbers and pulses as the synchronization strategy as instructed by the compiler 310.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
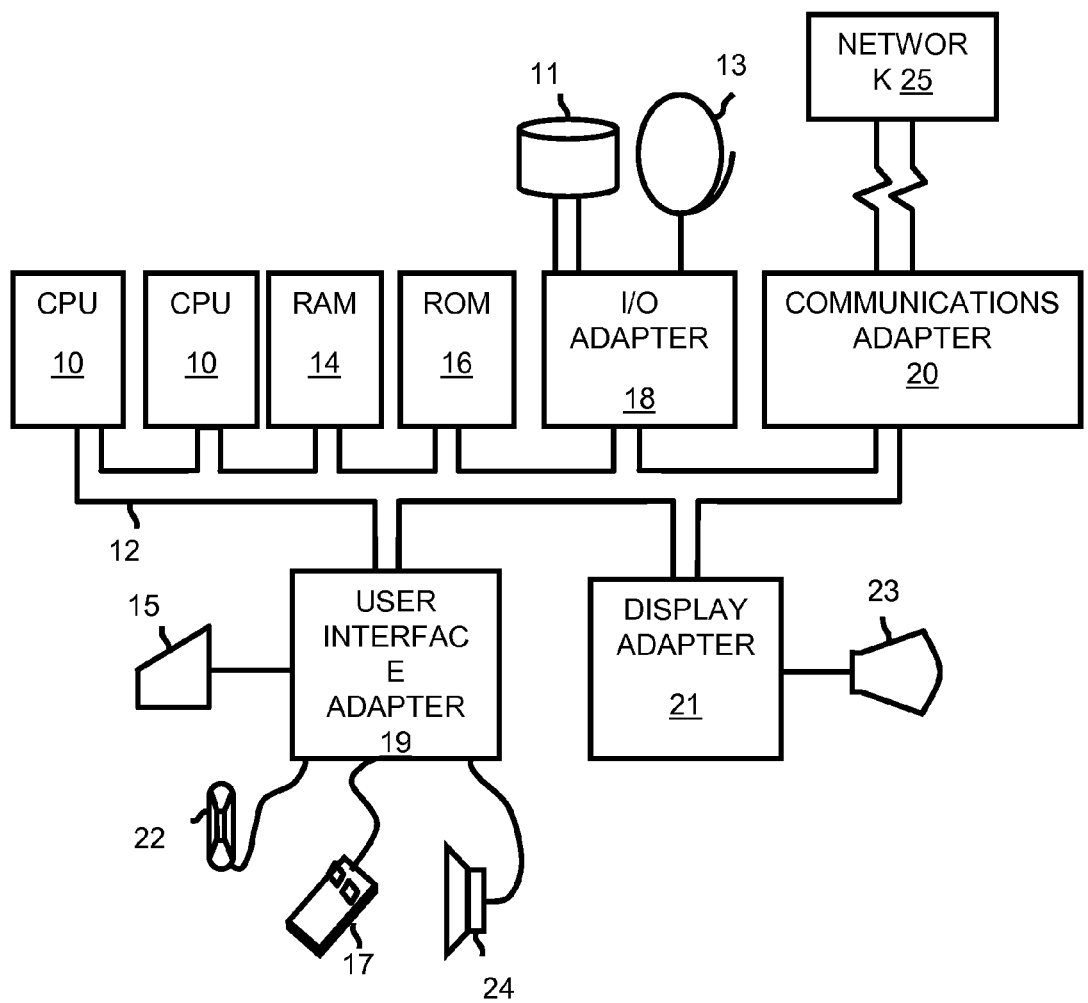
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for exploiting stateless and stateful data parallelism in a streaming application, said method comprising:
determining with a compiler whether an operator of the streaming application is safe to parallelize, said determining whether an operator of the streaming application is safe to parallelize being based on a definition of the operator and an instance of the definition, the definition of the operator including a template of the operator, and the instance of the definition including a modified version of the template,
the operator being not safe to parallelize when the operator has selectivity greater than 1, the selectivity being a number of output tuples generated for each input tuple;
forming parallel regions within the streaming application with the compiler when the operator is safe to parallelize;
determining synchronization strategies for the parallel regions with the compiler, the synchronization strategies being determined based on the definition of the operator and the instance of the definition;
enforcing the synchronization strategies of the parallel regions with a runtime system; and
performing a shuffle when two adjacent parallel regions include incompatible keys.

2. The method according to claim 1, wherein the operator is not safe to parallelize when at least one of:
the operator has a non-partitioned state;

the operator has more than one input port;
the operator has more than one output port;
the operator is depended on by another operator, wherein the dependency is a co-location constraint; and
the operator is depended on by another operator, wherein the another operator consumes punctuations generated by the operator.

3. The method according to claim 1, where the runtime system uses at least one of round-robin and sequence numbers and pulses as the synchronization strategy as instructed by the compiler.

4. A method for exploiting stateless and stateful data parallelism in a streaming application, said method comprising:
determining whether parallelizing an operator of the streaming application will preserve sequential semantics of the streaming application with a compiler, said determining whether parallelizing an operator of the streaming application will preserve sequential semantics of the streaming application being based on an operator template and an operator instance, the operator being not safe to parallelize when at least one of:
the operator has a non-partitioned state,
the operator has selectivity greater than 1, wherein the selectivity is a number of output tuples generated for each input tuple,
the operator has more than one input port,
the operator has more than one output port,
the operator is depended on by another operator, wherein the dependency is a co-location constraint, and the operator is depended on by another operator, wherein the another operator consumes punctuations generated by the operator;
forming parallel regions within the streaming application with the compiler when the operator is safe to parallelize;
determining synchronization strategies for the parallel regions with the compiler, the synchronization strategies being determined based on the operator template and the operator instance;
implementing the synchronization strategies of the parallel regions with a runtime system, where the runtime system uses round-robin and sequence numbers and pulses as the synchronization strategy as instructed by the compiler; and
performing a shuffle when two adjacent parallel regions include incompatible keys.

5. The method according to claim 4, wherein when a parallel region of the parallel regions include more than one operator instance with a partitioned state, the operator instances of the parallel region include compatible keys.

* * * * *